United States Patent
Mattes et al.

(10) Patent No.: US 7,102,495 B2
(45) Date of Patent: Sep. 5, 2006

(54) METHOD FOR PREVENTING COLLISIONS INVOLVING MOTOR VEHICLES

(75) Inventors: Bernhard Mattes, Sachsenheim (DE); Berend-Wilhelm Doden, Ludwigsburg (DE); Rainer Moritz, Filderstadt (DE); Jochen Wagner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 10/474,595

(22) PCT Filed: Feb. 16, 2002

(86) PCT No.: PCT/DE02/00574

§ 371 (c)(1),
(2), (4) Date: Mar. 31, 2004

(87) PCT Pub. No.: WO02/083470

PCT Pub. Date: Oct. 24, 2002

(65) Prior Publication Data
US 2004/0153217 A1    Aug. 5, 2004

(30) Foreign Application Priority Data
Apr. 12, 2001 (DE) ................. 101 18 707

(51) Int. Cl.
*B60Q 1/00* (2006.01)

(52) U.S. Cl. .................. 340/435; 340/452; 340/453; 180/276; 303/160

(58) Field of Classification Search ............... 340/435, 340/436, 903, 451, 452, 453, 467, 466; 180/167, 180/169, 170, 276; 701/301; 303/132, 160, 303/166
See application file for complete search history.

(56) References Cited

U.S. PATENT DOCUMENTS

| | | | |
|---|---|---|---|
| 5,684,473 A * | 11/1997 | Hibino et al. ............... | 340/903 |
| 5,731,977 A | 3/1998 | Taniguchi et al. | |
| 5,818,355 A * | 10/1998 | Shirai et al. ................ | 340/903 |
| 6,149,251 A | 11/2000 | Wuerth et al. | |
| 6,696,929 B1 * | 2/2004 | Igaki et al. ................. | 340/435 |
| 6,724,300 B1 * | 4/2004 | Miyakoshi et al. ......... | 340/435 |

FOREIGN PATENT DOCUMENTS

DE     26 42 211     6/1978

(Continued)

OTHER PUBLICATIONS

"Adaptive Cruise Control System—Aspects and Development Trends" by Winner, Witte, Uhler and Lichtenberg, Robert Bosch GmbH, in *SAE Technical Paper Series* 961010, International Congress & Exposition, Detroit, Feb. 26-29, 1996.

*Primary Examiner*—Davetta W. Goins

(74) *Attorney, Agent, or Firm*—Kenyon & Kenyon LLP

(57) ABSTRACT

A collision prevention method for motor vehicles is provided, in which method obstacles in front of the vehicle are detected by an on-board positioning system, a collision probability is calculated from the position data, and one or more responses to prevent a collision are triggered as a function of the collision probability. At least one of the responses is a preparatory measure accelerating the implementation of a command, which may be output later, to decelerate the vehicle, without the preparatory measure itself having any significant decelerating effect on the vehicle.

2 Claims, 3 Drawing Sheets

FOREIGN PATENT DOCUMENTS

| | | |
|---|---|---|
| DE | 36 37 165 | 5/1988 |
| DE | 43 28 304 | 3/1994 |
| DE | 19615294 | 10/1997 |
| DE | 197 45 128 | 4/1999 |
| EP | 0 941 903 | 9/1999 |
| EP | 0 965 508 | 12/1999 |
| EP | 1 070 624 | 1/2001 |
| EP | 1 061 004 | 3/2001 |
| EP | 1 095 833 | 5/2001 |
| EP | 1 127 728 | 8/2001 |
| EP | 1 184 244 | 3/2002 |
| EP | 1 185 431 | 3/2002 |
| WO | WO 99 20508 | 4/1999 |
| WO | WO 02 14128 | 2/2002 |

* cited by examiner

METHOD FOR PREVENTING COLLISIONS INVOLVING MOTOR VEHICLES

FIELD OF THE INVENTION

The present invention relates to a collision prevention method for motor vehicles, in which method obstacles in front of the vehicle are detected by an on-board positioning system, a collision probability is calculated from the position data, and one or more responses to prevent a collision are triggered as a function of the collision probability.

BACKGROUND INFORMATION

A collision-prevention method, in particular for use in combination with a system for adaptive cruise control in motor vehicles, is described in the publication "Adaptive Cruise Control System—Aspects and Development Trends" by Winner, Witte, Uhler and Lichtenberg, Robert Bosch GmbH, in *SAE Technical Paper Series* 961010, International Congress & Exposition, Detroit, Feb. 26–29, 1996. The Adaptive Cruise Control (ACC) system described in this publication is based on a distance sensor, for example, a multi-target-capable radar sensor mounted on the front of the vehicle to measure distances and relative speeds of other vehicles driving in front. The speed of one's own vehicle is regulated as a function of the measured data from this radar sensor so as to maintain a desired preset distance from the vehicle driving directly in front, and the driver is able to preselect this desired preset distance in the form of a setpoint time window. If there is no vehicle traveling in front within the range of the radar, the speed is regulated at a desired speed set by the driver.

This system normally intervenes in the drive system of the vehicle via a throttle valve, for example, so that the vehicle speed is regulated on the basis of the driving torque of the engine. However, when greater deceleration of the vehicle is required, e.g., on a downward slope or due to the distance from the vehicle in front, and the engine drag is not enough to achieve adequate deceleration of the vehicle, then the system intervenes in the brake system of the vehicle.

Published German patent document DE 36 37 165 describes a control method in which the relative speed of approach of the object which is the source of the collision risk, the theoretical period of time until impact in the absence of response, and the vehicle deceleration required at that instant to reliably prevent the collision are calculated from the position data compiled and an adequate safety distance is determined, taking into account the possible braking deceleration of the vehicle. The extent to which the actual distance is less than this safety distance is a measure of the collision probability. Subsequently, the system responds in three stages as a function of the collision probability thus determined. In stage 1, just an acoustic or visual warning signal is output for the driver. In stage 2, there is automatic intervention in the brake system at a braking force calculated in advance. Finally, in stage 3, a braking operation at maximum braking force is triggered.

In these methods, however, there are problems in determining the criteria for triggering of stage 2 because of the unavoidable uncertainty in estimating the collision risk. If the threshold for triggering of this stage is set too high, collisions cannot be reliably prevented. However, if this threshold is lowered, it results in unnecessary braking maneuvers, because of an incorrect appraisal of the collision risk; the unnecessary braking may also have a negative effect on the comfort and feeling of safety of the occupants of the vehicle, while irritating the following traffic or even becoming the cause of rear-end collisions in the following traffic.

The object of the present invention is to reduce the frequency of unnecessary vehicle decelerations while maintaining a high collision safety.

SUMMARY

The object of the present invention is achieved by providing that at least one of the responses to a detected collision risk is a preparatory measure accelerating the implementation of a command, which may be output later, to decelerate the vehicle, without the preparatory measure itself having any significant decelerating effect on the vehicle.

The present invention utilizes the fact that a system-related response time always elapses between the output of a command having as its goal a reduction in vehicle speed and the actual implementation of the vehicle deceleration. Instead of compensating for this response time by a correspondingly earlier output of the command, preparatory measures are implemented first according to the present invention, resulting in a shortened response time. If the suspected collision risk is then confirmed and intervention in the sense of decelerating the vehicle is actually necessary, the desired deceleration of the vehicle may be implemented immediately. However, if the suspected risk is not confirmed, the preparatory measure may be reversed again without resulting in unnecessary vehicle deceleration. In this case, the precautionary measures taken remain virtually unnoticed by the driver and other occupants of the vehicle, as well as by the following traffic.

A significant portion of the response time which elapses between triggering of a braking command and the actual point in time when the vehicle brake becomes effective is attributable to unavoidable dead volumes in the hydraulic system of the brake system. These dead volumes must first be filled with brake fluid before the brake shoes come into frictional contact with the brake disks or brake drums of the wheel brakes and the brake becomes effective. The time required for filling the dead volumes is approximately 200 ms to 300 ms in the conventional brake systems. At a driving speed of approximately 30 m/s (108 km/h) this corresponds to lengthening the stopping distance by up to 9 meters.

It is known that in traction control systems and comparable, systems in which braking intervention is also implemented independently of the driver under certain conditions, this dead time may be avoided or shortened by creating a command for prefilling or "priming" of the brake system before the actual braking intervention, as disclosed in published German patent document DE 196 15 294.

In an example embodiment of the present invention, such a command for priming the brake system is generated as a function of the calculated collision probability. In this way, the vehicle is put in a condition of increased braking readiness when there is a medium collision risk, so that when the collision risk is confirmed and a braking intervention measure is necessary, the braking effect begins much more rapidly.

"Priming" of the brake system is understood here to refer in general to a measure which puts the brake system in a state in which it is able to respond more quickly to a braking command, without the measure itself resulting in a significant braking effect. This priming of brakes may be accomplished, for example, by building up a certain brake pressure in the wheel brake cylinders and/or in the components of the hydraulic system immediately upstream from them, so that the brake shoes are already approaching the brake disk or brake drum of the wheel brake or are even in contact with it without exerting any mentionable frictional force. As an alternative or in addition, the priming of brakes may also be accomplished by providing a certain prepressure in a pressure accumulator or in a brake booster, which permits more rapid filling of the dead volume when the brakes are actually operated.

In vehicles having an ACC system providing measures for intervening in the brake system, it is generally necessary to switch between engine operation, in which positive or negative acceleration of the vehicle is achieved through driving torque alone, i.e., the engine drag, and braking operation, in which vehicle deceleration is achieved by operation of the brakes. To prevent "fluttering" in switching between engine operation and braking operation, the present invention provides for the switching to be performed as a function of an acceleration request signal with a certain hysteresis. Switching from engine operation to braking operation is performed when the acceleration request signal falls below a low threshold value, and returns to engine operation when the acceleration request signal exceeds a higher threshold value which corresponds to the vehicle deceleration achievable by engine drag. However, although this hysteresis characteristic is desirable per se, it results in the braking intervention taking place only with a certain time lag, namely only when the acceleration request signal has reached the lower threshold value. Therefore, a "preparatory measure" in accordance with the present invention may therefore also include reduction of the hysteresis interval when there is a moderate collision risk and possibly set it back completely at zero, so that the braking command is generated immediately when the engine drag is no longer sufficient to achieve the required vehicle deceleration.

In automobiles having an automatic transmission, one preparatory measure would also involve automatically downshifting to a lower gear when there is a moderate collision risk—without an immediate change in setpoint acceleration—so that a greater engine drag is available for vehicle deceleration even in engine operation. This measure also has the advantage that in many cases it is possible to respond to a temporary disturbance in traffic flow without a braking intervention, so that the following traffic is not irritated by flickering of the brake lights, and after the disturbance has passed, it is possible to accelerate back up to the desired speed more rapidly.

All these measures may be combined and triggered at the same threshold value or optionally also at different threshold values of the collision probability.

DETAILED DESCRIPTION

Figure 1:
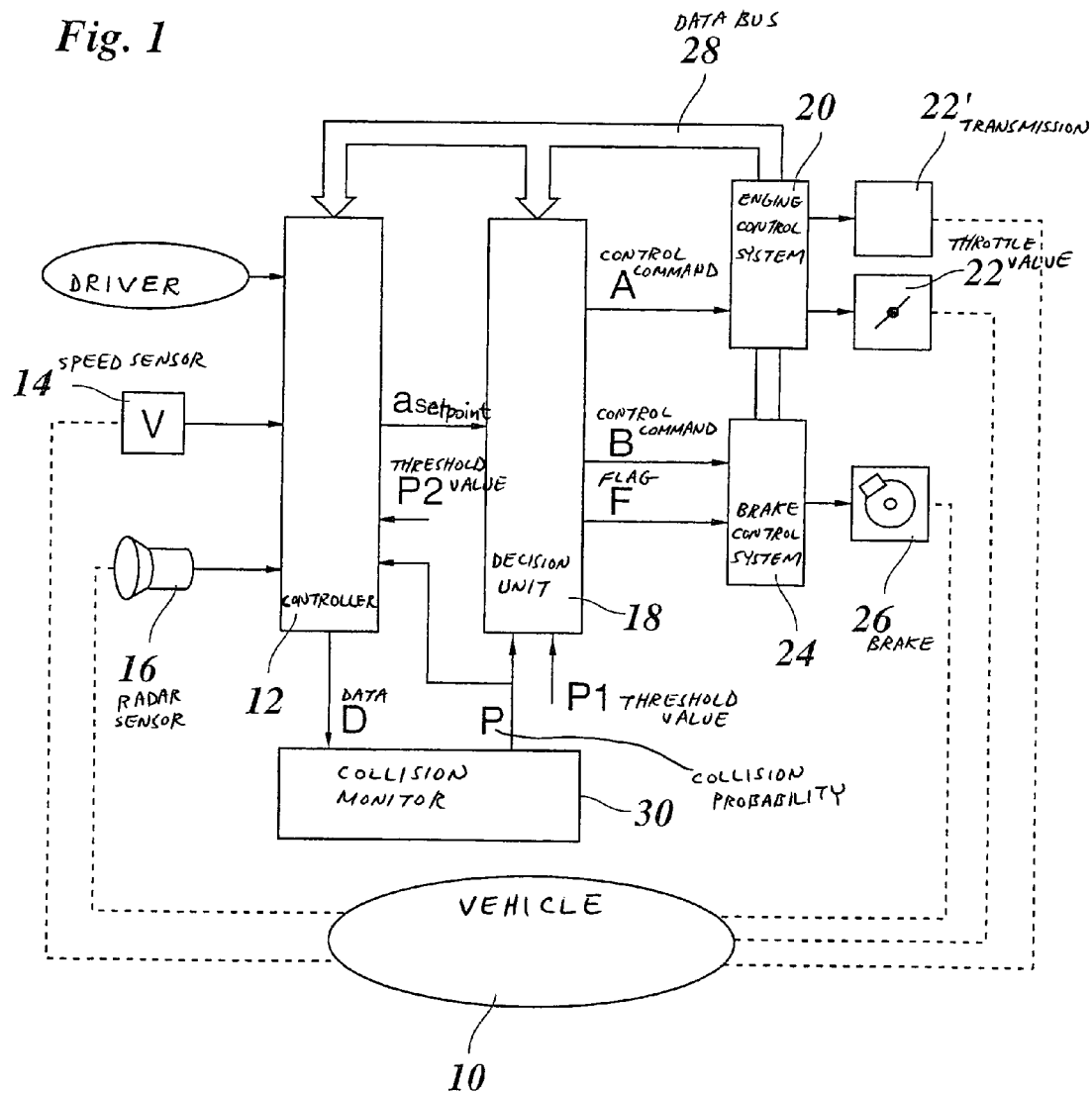
FIG. 1 shows a block diagram of an ACC system of a motor vehicle for implementing the method according to the present invention.

FIG. 1 symbolically shows a motor vehicle 10, the speed of which is regulated with the help of an ACC system. A controller 12 receives a signal from a speed sensor 14 indicating the actual speed of the vehicle. In addition, a positioning device is mounted on the front of the vehicle; in the present example, this is a radar sensor 16 which reports distance and relative velocity data on objects located in front of the vehicle to controller 12. Radar sensor 16 preferably has a certain angular resolution, so the azimuth angle of the objects located may also be detected and reported to controller 12. It is possible in this way for the radar sensor 16 and/or controller 12 to differentiate vehicles traveling ahead in one's own lane from vehicles in other lanes and stationary targets at the edge of the road surface. If vehicles driving in front are in one's own lane, the vehicle immediately in front is selected as a target object and the speed of vehicle 10 is regulated so as to maintain a certain setpoint distance from the vehicle in front. This setpoint distance is selectable by the driver by input of a setpoint time window, which indicates the interval of time during which the vehicle in front and one's own vehicle pass by the same point on the road surface. The setpoint distance is thus dynamically adapted to the particular driving speed.

If the road surface in front of one's own vehicle is unoccupied, a controller will switch to a desired speed selected by the driver if the driver has entered a corresponding command.

In addition, controller 12 also analyzes operating commands as well as driving commands from the driver, e.g., the degree of operation of the gas pedal and, if appropriate, the brake pedal. The driver thus has the option to actively intervene at any time in the process in order to respond properly in critical driving situations.

Different regulating and control strategies are thus implemented in controller 12, and one or more regulating strategies are selected, depending on the driving situation or commands from the driver, and their results are linked in a suitable manner to form an acceleration request signal $a_{setpoint}$ which indicates the instantaneous setpoint acceleration of the vehicle.

A decision unit 18 decides on the basis of acceleration request signal $a_{setpoint}$ whether intervention in the drive system or the brake system of the vehicle is necessary. In the case of positive values of the acceleration request signal, there is intervention in the drive system. In this case, a control command A is output to an electronic engine control system 20, which acts, by way of various actuators, symbolized here by a throttle valve 22, on the engine and, if appropriate, on transmission 22' of motor vehicle 10. In general, the functions of engine control system 20 may include controlling throttle valve 22, controlling the fuel injection system, the ignition, and other components of the drive system of the vehicle. In the case of a vehicle having an automatic transmission, this may also include selecting the gear. On the basis of control command A and instantaneous engine operation parameters, engine control system 20 controls the engine to generate an engine driving torque corresponding to the acceleration request signal.

If acceleration request signal $a_{setpoint}$ assumes a negative value, first the engine is throttled by engine control system 20 so that the engine drag is utilized to decelerate the vehicle. However, if decision unit 18 finds that the vehicle deceleration achievable in this way is not sufficient to keep the actual acceleration of the vehicle the same as the setpoint acceleration represented by $a_{setpoint}$, the system is switched to braking operation by decision unit 18. In this case, the engine remains throttled and decision unit 18 delivers a control command B to a brake control system 24 of the vehicle. Brake control system 24 controls the function of brakes 26 provided on the individual wheels via the hydraulic brake system of the vehicle and fulfills the functions of, for example, an ABS system, a traction control system, and/or an ESP system for dynamic stabilization of the vehicle.

The hydraulic brake system of the vehicle is connected directly to the brake pedal of the vehicle for reasons of fail-safe function and contains at least one pressure booster which amplifies the brake force exerted by the driver by way of the brake pedal. Within the context of the traction control or ESP system, the booster is also capable of generating a braking pressure independently of operation of the brake pedal and thereby of operating brakes 26. Likewise, control command B relayed by decision unit 18 also triggers brake operation with a fixed or variable braking force.

If control command B is output when the vehicle brake has not been operated and the wheel brake cylinders are pressureless, then first the unavoidable dead volumes in the hydraulic brake system and in the wheel brake cylinders in particular must be filled with brake fluid before there is actually a frictional connection between the brake shoes and the brake drums or brake disks, at which time the brakes become effective. To shorten the time required for filling these dead volumes, brake control system 24 has a function which makes it possible to initiate prefilling of the brake system. In this procedure, which is referred to here as "priming," the brake system is put under pressure to such an extent that the dead volumes are filled and the brake shoes closely approach or even lightly contact the brake disks or brake drums. In the latter case, slight wear on the brakes must be tolerated.

This priming function may be triggered not only within brake control system 24 but also externally by a suitable filling signal output by decision unit 18 in the form of a flag F. Depending on the condition of the brake system, setting of flag F causes prefilling of the brake system to be triggered by brake control unit 24. If flag F is reset, this prefilling operation is reversed by brake control unit 24 unless the brakes have actually been operated by control command B in the meantime.

Parameters characterizing the condition of the engine and the brake system of the vehicle are available to drive control system 20 and/or brake control system 24 and may be sent to other system components of the vehicle over a data bus 28 (CAN bus) so that they may also be available for analysis in controller 12 and in decision unit 18 in case of need.

The changes in vehicle acceleration caused by the intervention into the drive system or the brake system of the vehicle result in corresponding changes in the vehicle speed and the distance from the vehicle in front, which changes are sent as feedback via speed sensor 14 and radar sensor 16.

A collision monitor 30 receives a set of data D from controller 12 within each control cycle of 1 ms, for example, thus permitting an estimation of the collision probability. For example, for each object detected by radar sensor 16, this data includes the distance between one's own vehicle and the detected object, the relative speed between the object and one's own vehicle, the azimuth angle of the object in relation to the straight-ahead direction of one's own vehicle, and/or the lateral offset of the object calculated therefrom in relation to the vehicle and the vehicle speed measured by speed sensor 14 and the steering angle measured by a steering angle sensor (not shown) of one's own vehicle. Collision monitor 30 first calculates from this data a collision probability for each object detected, this probability being greater, the shorter the distance from the object, the greater the absolute value of the (negative) relative speed and the smaller the lateral offset of the object. From the resulting collision probabilities for the individual objects, a collision probability P is formed, e.g., by selection of the maximum, and this probability is relayed to decision unit 18 and controller 12.

Decision unit 18 and controller 12 compare collision probability P with multiple preset threshold values P1, P2, each of which, when exceeded, will trigger a certain response. In the example here, it should be assumed that flag F is set when a first threshold value P1, which corresponds to a moderate collision probability, is exceeded; this puts the vehicle in a state of increased braking readiness. When the higher second threshold value P2 is exceeded, this indicates an acute collision risk and results in triggering of a braking operation.

Figure 2:
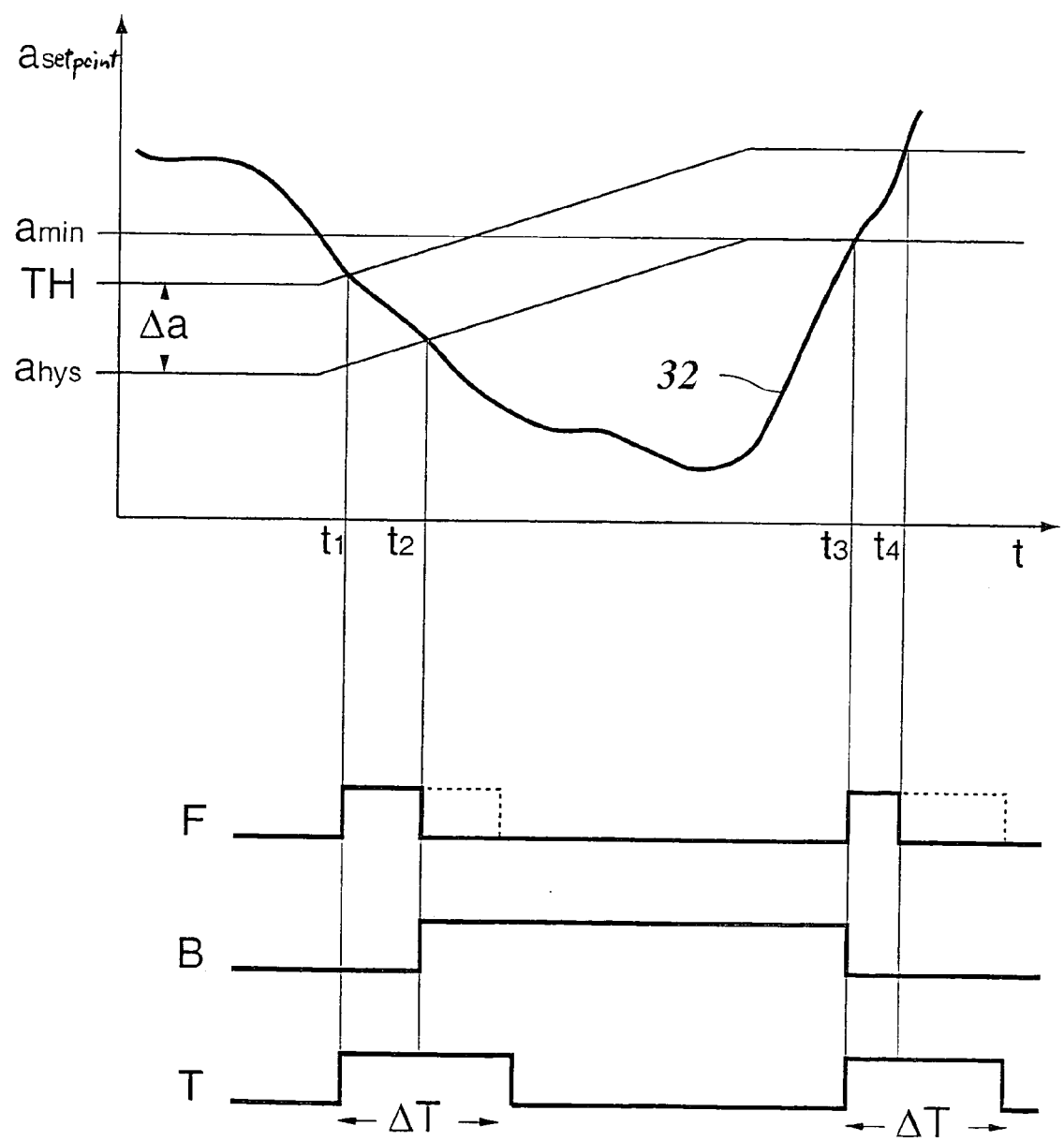
FIG. 2 shows a time diagram of signals occurring in the ACC system shown in FIG. 1.

With reference to FIG. 2, the functioning of the control system shown in FIG. 1 will now be explained first without taking into account the function of collision monitor 30.

FIG. 2 shows curve 32 in the top part of the diagram as an example of a plot of acceleration request signal $a_{setpoint}$ output by controller 12 over time. An acceleration value $a_{min}$ represents the smallest possible (negative) acceleration achievable under the instantaneous operating conditions based on engine drag. However, output of control command B and thus the switch to braking operation takes place only when $a_{setpoint}$ falls below a somewhat lower value $a_{hys}$ at time $t_2$, but the switch back to engine operation takes place at time $t_3$ at which acceleration request signal $a_{setpoint}$ becomes greater than $a_{min}$ again. This hysteresis function prevents decision unit 18 from "fluttering" between braking operation and engine operation. However, hysteresis interval $a_{min}-a_{hys}$ is not static, but instead varies dynamically. From the moment when acceleration request signal $a_{setpoint}$ falls below $a_{min}$, the hysteresis interval is reduced to 0 at a constant rate of change, so that $a_{hys}$ approaches $a_{min}$. Thus, although it is tolerable for the value to fall below $a_{min}$ briefly, if this subminimum level persists for a longer period of time, the system will switch to braking operation (at time $t_2$ in the example presented here) due to the higher trigger threshold $a_{hys}$.

FIG. 2 also shows a threshold value TH, which is greater than $a_{hys}$ by a fixed absolute value $\Delta a$. If $a_{setpoint}$ falls below this threshold value TH at time $t_1$, flag F is set and thus prefilling of the brake system is initiated. Time τ which is needed for prefilling of the brake system amounts to approx. 200 ms to 300 ms, depending on design. Controller 12 is designed so that the rate of change of acceleration request signal $a_{setpoint}$ over time has a lower limit, e.g., it holds that $d/dt\,(a_{setpoint}) > -1.0\ m/s^3$. Therefore, in order for prefilling of the brake system to be concluded in the period of time between $t_1$ and $t_2$, it must hold that $\Delta a > \tau * |d/dt\,(a_{setpoint})|$. In the example here, $\Delta a = 0.35\ m/s^2$ would therefore be a suitable value by which threshold value TH should be above trigger threshold $a_{hys}$.

If acceleration request signal $a_{setpoint}$ falls below trigger threshold $a_{hys}$ and the brake is actually triggered, flag F is reset. If $a_{setpoint}$ does not reach trigger threshold $a_{hys}$, flag F is reset at the latest after a predetermined period of time $\Delta T$ which is determined by signal T of a timer. The timer is started when $a_{setpoint}$ reaches threshold value TH (at $t_1$) and signal T then drops back again after a predetermined period of time $\Delta T$ has elapsed. Flag F is also reset with the descending flank if it is still active then. This case is shown with a dotted line for the signal curve of flag F in FIG. 2.

In the example shown here, acceleration request signal $a_{setpoint}$ again rises above $a_{min}$ at time $t_3$, at which time decision unit 18 switches back to engine operation so that control command B, which has been output to brake control system 24, drops again. At this point in time, flag F is set again. If the acceleration request signal again drops below $a_{min}$ without reaching threshold value TH in the meantime, the brakes may thus be activated again without delay. Only if acceleration request signal $a_{setpoint}$ has again risen above threshold value TH (now elevated at time $t_4$) or if the period of time $\Delta T$ has elapsed again is flag F reset and the primed condition of the brake system canceled.

Figure 3:
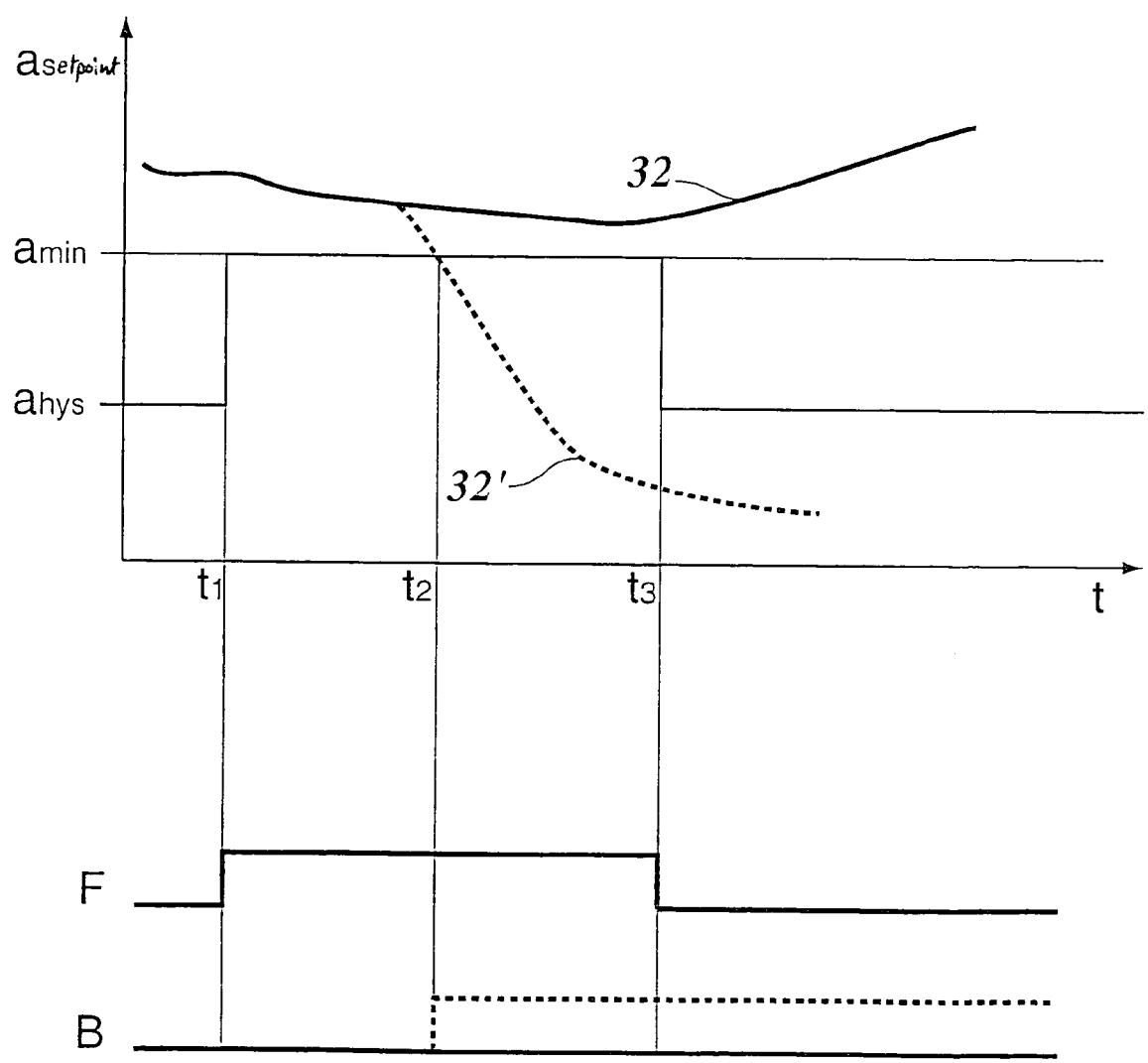
FIG. 3 shows a time diagram corresponding to that in FIG. 2 for the case of responding to a recognized collision risk by increasing braking readiness.

FIG. 3 illustrates the case in which collision probability P supplied by collision monitor 30 exceeds first threshold value P1 at a time $t_1$. For example, this increase in collision probability P may be caused by the fact that a slower traveling vehicle in a neighboring lane is no longer staying in its lane and is approaching one's own lane, giving cause for concern. Since this does not yet result in selection of this vehicle traveling in the neighboring lane as a target object for the distance control, acceleration request signal $a_{setpoint}$ should not be affected by it initially. This signal therefore remains above value $a_{min}$, as illustrated by curve 32, shown with a solid line in FIG. 3. Nevertheless, flag F is set when collision risk P exceeds the threshold value at time $t_1$. Unlike the case in question in FIG. 2, flag F here remains without any time restriction until collision risk P again drops below threshold value P1 at time $t_3$, e.g., because the vehicle traveling in the next lane has returned to the center of that lane.

In addition, in the period of time between $t_1$ and $t_3$, the trigger threshold for control command B is raised from $a_{hys}$ to $a_{min}$ so there is no longer any hysteresis in switching between engine operation and braking operation. However, since acceleration request signal $a_{setpoint}$ remains above $a_{min}$, this also has no effect on the vehicle speed. At any rate, there might be slight grinding of the brake shoes on the brake drums or brake disks due to the priming of the brake system which has been prompted by flag F. However, the resulting deceleration effect is negligible. Plus, on the whole, in the period of time between $t_1$ and $t_3$ the vehicle remains in a condition in which there is no actual deceleration of the vehicle but instead only its braking readiness is increased.

If the vehicle driving in the neighboring lane does not return to the center of this neighboring lane but instead actually changes to one's own lane, it is selected as a target object by controller 12 and the distance control is then based on this vehicle. This results in a definite decline in acceleration request signal $a_{setpoint}$ according to curve 32' shown with a dotted line in FIG. 3.

If an acute hazard situation occurs due to lane changing by the vehicle in front, collision probability P will even exceed higher threshold value P2. Controller 12 responds to this situation by suspending the restriction on the rate of change of the acceleration request signal. Acceleration request signal $a_{setpoint}$ may therefore decline very rapidly at a rate of change which is greater in terms of its absolute value than the limit of 1 m/s$^3$. Because of this fact and because of the increase in the trigger threshold from $a_{hys}$ to $a_{min}$, control command B for activation of the brakes is output after a very short period of time at time $t_2$. Since the brake system has already been primed at time $t_1$, the brakes are effective immediately so that the collision may be prevented.

If the collision probability is even higher, a command for operation of the brake at maximum braking force may also be generated directly by decision unit 18 without regard for the acceleration request signal supplied by the controller. Again in this case, the preparatory setting of flag F results in an immediate execution of the braking command. Likewise, automatic priming of the brake system will also have a positive effect if the driver himself notices the acute collision risk and operates the brake pedal.

The invention claimed is:

1. A collision-prevention method for a motor vehicle having a control system, a drive system and a brake system, comprising:
   detecting an obstacle in front of the motor vehicle by an on-board position detecting system;
   calculating a collision probability from position data of the detected obstacle; and
   triggering, as a function of the collision probability, at least one response configured to prevent a collision, the at least one response including at least one preparatory measure configured to accelerate an implementation of a command to decelerate the motor vehicle in case the command is actually output, wherein said preparatory measure is an output of a command for priming the brake system of the vehicle, which causes a pressure buildup to take place in a component of the brake system such that a brake shoe is made to approach or touch at least one of a brake disk and a brake drum but does not have any significant decelerating effect on the vehicle;
   wherein, when the collision probability is substantially minimal, the control system implements at least one of an intervention in the drive system and an intervention in the brake system as part of a cruise control function having a hysteresis characteristic, and wherein the preparatory measure includes a reduction of a hysteresis interval when the collision probability is increasing.

2. The method as recited in claim 1, wherein the motor vehicle further includes an automatic transmission, and wherein a plurality of preparatory measures are provided, one of the preparatory measures being a transmission intervention to downshift a gear.

* * * * *